United States Patent
Wooters

[19]

[11] Patent Number: 6,034,923
[45] Date of Patent: Mar. 7, 2000

[54] SEISMIC SENSOR POD

[75] Inventor: Timothy M. Wooters, West Columbia, Tex.

[73] Assignee: Marine Innovations, L.L.C., Richmond, Tex.

[21] Appl. No.: 08/900,911

[22] Filed: Jul. 28, 1997

[51] Int. Cl.$^7$ .................................................. G01V 1/36
[52] U.S. Cl. .............................. 367/21; 367/24; 181/110
[58] Field of Search .......................... 340/15.5; 367/16 J, 367/15, 17, 21, 24, 18; 181/110; 439/201, 207, 587, 589

[56] References Cited

U.S. PATENT DOCUMENTS

| | | | |
|---|---|---|---|
| H387 | 12/1987 | Kruka et al. | 367/154 |
| 3,914,014 | 10/1975 | James | 174/21 |
| 4,281,402 | 7/1981 | Kruka et al. | 367/17 |
| 4,317,185 | 2/1982 | Thigpen et al. | 367/15 |
| 5,387,119 | 2/1995 | Wood | 439/281 |
| 5,404,339 | 4/1995 | Cole, Jr. | 367/16 |
| 5,470,248 | 11/1995 | Wood | 439/281 |
| 5,510,577 | 4/1996 | Corrigan | 367/15 |
| 5,542,856 | 8/1996 | Wood | 439/281 |
| 5,624,288 | 4/1997 | Becker | 439/843 |
| 5,631,711 | 5/1997 | Fowler | 367/15 |
| 5,711,685 | 1/1998 | Wood | 439/587 |
| 5,724,307 | 3/1998 | Gaiser | 367/21 |
| 5,772,457 | 6/1998 | Cairns | 439/201 |
| 5,781,510 | 7/1998 | Chang et al. | 367/188 |
| 5,796,676 | 8/1998 | Chang et al. | 367/20 |
| 5,830,011 | 11/1998 | Wood | 439/587 |

OTHER PUBLICATIONS

Geo Space Corporation, GS–PV1–S Sales Brochure, p. 1, Mar. 1997.

Shaw Resource Services, Inc., Ocean Bottom Cable Advertisement in "Leading Edge Magazine", p. 1, Mar. 1997.

Cert Cell, Inc., Bay–Cable System Sales Brochure, p. 1, Sep. 1993.

*Primary Examiner*—Christine Oda
*Assistant Examiner*—Anthony Jolly
*Attorney, Agent, or Firm*—Timothy M. Honeycutt

[57] ABSTRACT

A seismic sensor pod is provided for coupling to a seismic cable and establishing a substantially water tight connection between the seismic cable and a seismic sensor. The pod includes a housing for holding the seismic sensor. The forward section of the housing includes a substantially sealed chamber. One or more conductors from the seismic cable are cut and the cut ends are projected into the chamber. Electrical connection between the cut ends of the conductors and the seismic sensor is established by a connector member. The pod provides a water resistant pathway between the conductors of the seismic cable and the seismic sensor, and a streamlined housing to hold the seismic sensor.

19 Claims, 5 Drawing Sheets

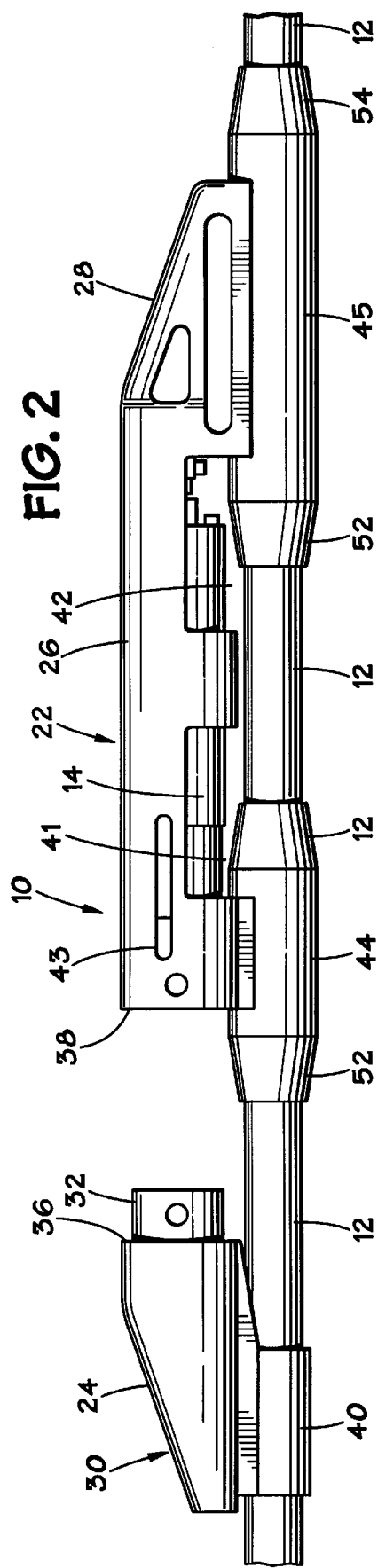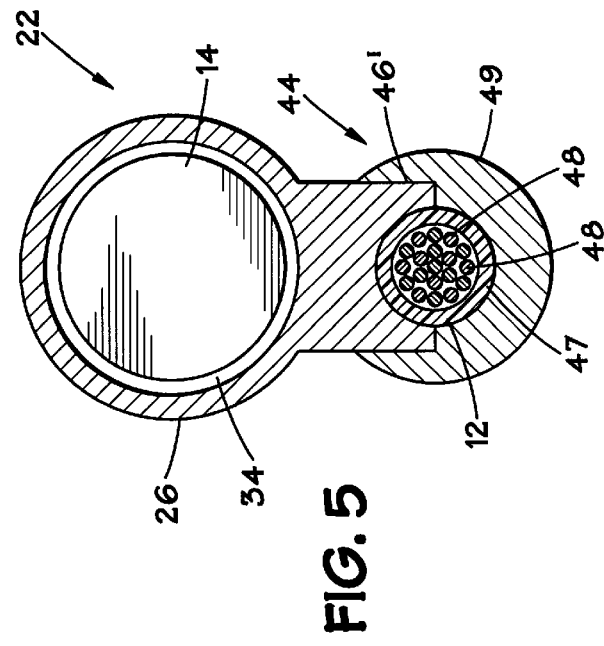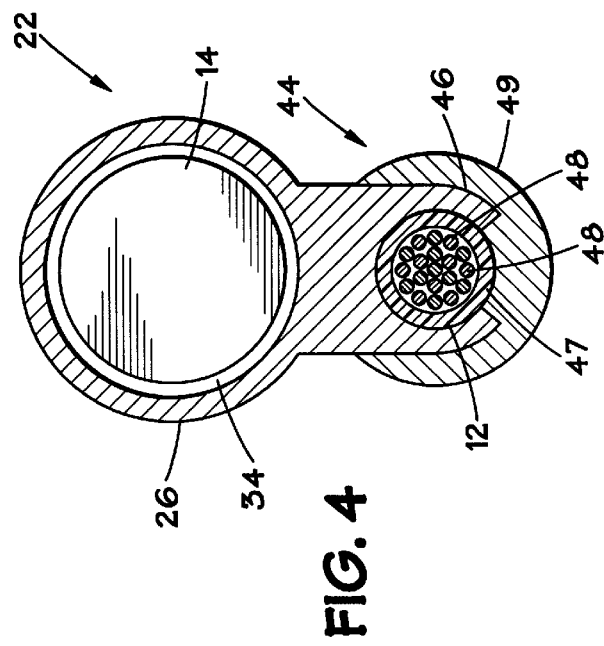

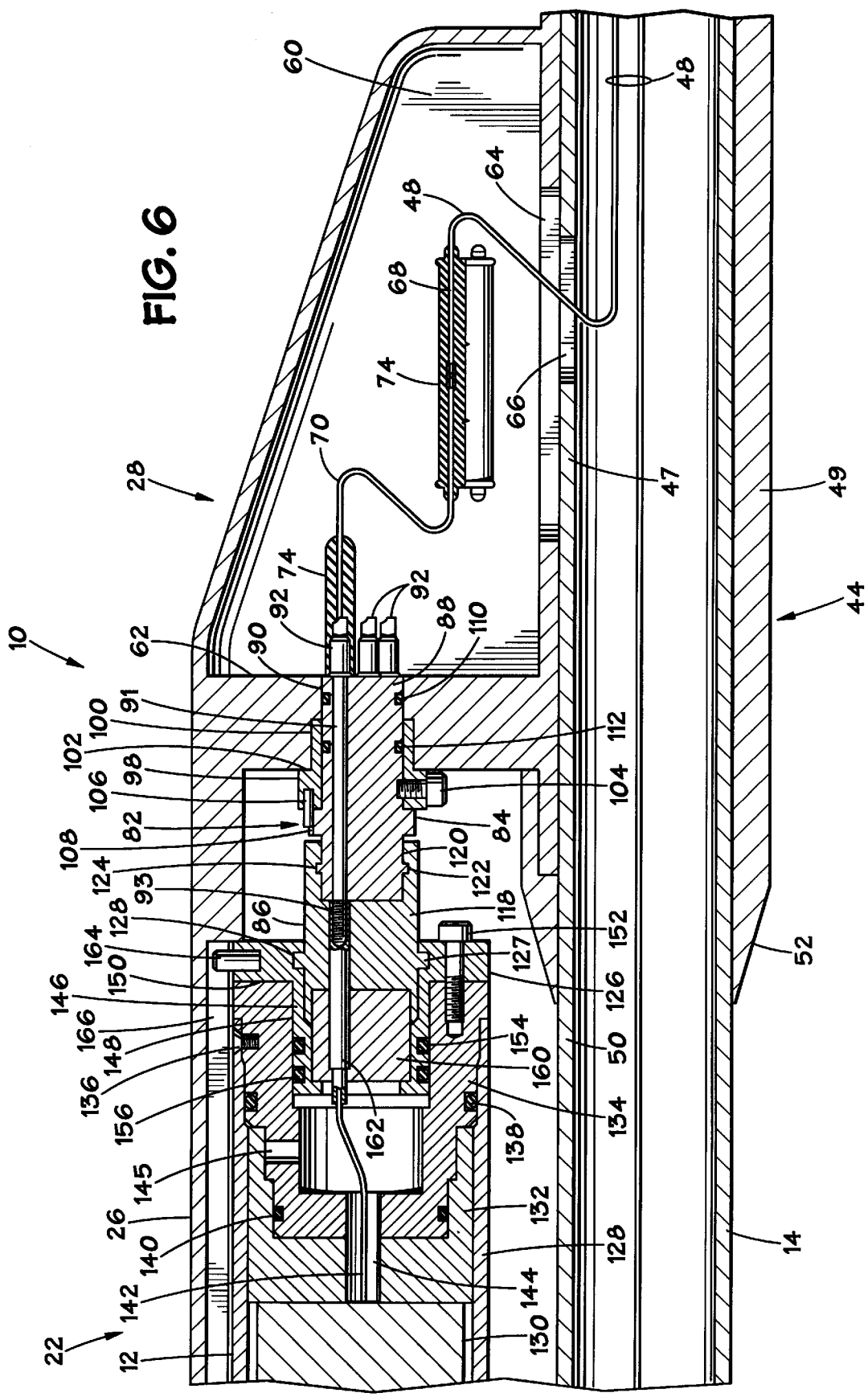

SEISMIC SENSOR POD

BACKGROUND OF THE INVENTION

1. Field of the Invention

This invention relates generally to subsea seismic exploration cables. More particularly, this invention relates to connection mechanisms between a seismic sensor phone and a subsea seismic exploration cable.

2. Description of the Related Art

The technique of seismically mapping a subsea formation has long been known in the field of oil and gas exploration. Traditional techniques for seismic mapping employ a number of ocean bottom cables ("OBC") laid parallel on the sea floor. Each cable is deployed from a recording boat via a tension controlled sheave and may be very long, sometimes in excess of 35,000 meters in length. A number of sensors, typically hydrophones, are connected to each cable at spaced intervals. A typical spacing interval for adjacent sensors is about 50 meters so the number of sensors for a given cable may be quite large, in excess of 5000 for a typical 35,000 meter OBC. OBC's typically consist of a plurality of individually insulated conductor wires disposed within a water resistant insulating jacket. Connection between a given sensor and the OBC involves penetrating the insulating jacket of the OBC and selectively removing one or more of the conductor wires for eventual splicing to the sensor. A pigtail wire is then connected to the splice ends of the OBC conductor wires and taped or tie-wrapped to the OBC. The sensor itself has a second pigtail that is connected to the first pigtail and may also be taped and tie-wrapped to the OBC. In some conventional OBC systems, the connection between the first pigtail and the splice ends of the OBC conductor wires is shrouded in a plastic housing. The combination of the plurality of OBC's and their respective plurality of sensors forms a seismic sensor array that is in communication with the recording boat. After the array is in place, acoustic pulses are passed into the subsea formation by air guns or other means. The behavior of the acoustic pulses is sensed and transmitted back to the recording boat by the array.

OBC systems must operate under harsh environmental conditions. During employment from and retrieval to the recording boat, the sensor drops are routinely subjected to rigorous forces from the rotating sheave mechanism that may nick, cut, or even sever the various pigtails as they pass across the sheave mechanism. The plurality of dangling pigtails presents a less than streamlined cross-section that must pass through the ship mechanism. In addition, the pigtails may hang up or be otherwise damaged by coral or other sea floor formations. Any perforation in any one of the pigtails may allow sea water to penetrate not only that particular pigtail, but also the associated OBC and possibly the entire cable array, rendering the entire array unuseable. As a result, the entire array must be recovered from the sea floor and either repaired or replaced with a new array.

There are a number of disadvantages associated with conventional sensor drops. The hundreds of individual pigtails associated with a single OBC represent literally hundreds of dangling cables that may be subject to perforation due to encounters with sea floor formations or during deployment from and retrieval to the recording boat. Furthermore, field repair of conventional sensor drops normally requires detailed procedures as well as special mixing of special potting materials. Specially trained personnel are ordinarily required to effect such repairs. In addition, structural failure of a pigtail while the OBC is submerged may result in total irretrievable loss of the sensor.

The present invention is directed to overcoming or reducing one or more of the foregoing disadvantages.

SUMMARY OF THE INVENTION

In accordance with one aspect of the present invention, a pod for coupling a seismic sensor to a seismic cable that has a first conductor is provided. The pod includes a housing for holding the seismic sensor and has a coupling for establishing sealing engagement with the exterior of the seismic cable and a substantially sealed chamber. A connector member is coupled to the housing and has a first connector that has a first end that is disposed in the substantially sealed chamber for providing substantially sealed electrical connection to the first conductor. The connector member includes a second connector for providing substantially sealed electrical connection to the seismic sensor.

In accordance with another aspect of the present invention, a seismic cable system is provided. The seismic cable system includes a seismic cable that has a first plurality of conductor wires. A pod is sealingly coupled to the seismic cable. The pod has a housing that includes a substantially sealed chamber. A connector member is coupled to the housing. The connector member has a first connector that has a first end disposed in the substantially sealed chamber and is sealingly coupled to the first plurality of conductor wires. The connector member also includes a second connector. A seismic sensor is coupled to the second connector and is disposed within the housing.

In accordance with yet another aspect of the present invention, a pod for coupling a seismic sensor to a seismic cable is provided. The pod includes a tubular housing for holding the seismic sensor and has a coupling for establishing sealing engagement with the exterior of the seismic cable and a substantially sealed chamber. A connector member is coupled to the housing and has a first connector that has a first end disposed in the substantially sealed chamber, and a second connector that has a second end. The first connector and the second connector are connected. A first conductor is sealingly coupled to the first connector and to the seismic cable. An adaptor is provided that has a first end sealingly coupled to the second connector. The adaptor and the second connector define an electrical socket connection. A seismic sensor is coupled to the adaptor.

In accordance with still another aspect of the present invention, a method of making a water resistant electrical circuit between a seismic sensor and a seismic cable wherein the seismic cable has a first conductor is provided. The method includes the steps of providing a second conductor and forming a first connection between the second conductor and the first conductor. The first connection is sealed with a first elastomeric boot. A connector member is provided. A second connection is formed between the connector member and the second conductor. The second connection is sealed with a second elastomeric boot. A third connection is formed between the connector member and the seismic sensor. The third connection is sealed with a third elastomeric boot.

BRIEF DESCRIPTION OF THE DRAWINGS

The foregoing and other advantages of the invention will become apparent upon reading the following detailed description and upon reference to the drawings in which:

FIG. 2 is a side view of the exemplary seismic sensor pod of FIG. 1 in accordance with the present invention;

FIG. 4 is a sectional view of FIG. 1 taken at section 4—4;

FIG. 5 is a sectional view like FIG. 4 showing an alternate embodiment of the pod housing coupling;

FIG. 6 is a sectional view of FIG. 1 taken at section 6—6;

DETAILED DESCRIPTION OF SPECIFIC EMBODIMENTS

Figure 1:
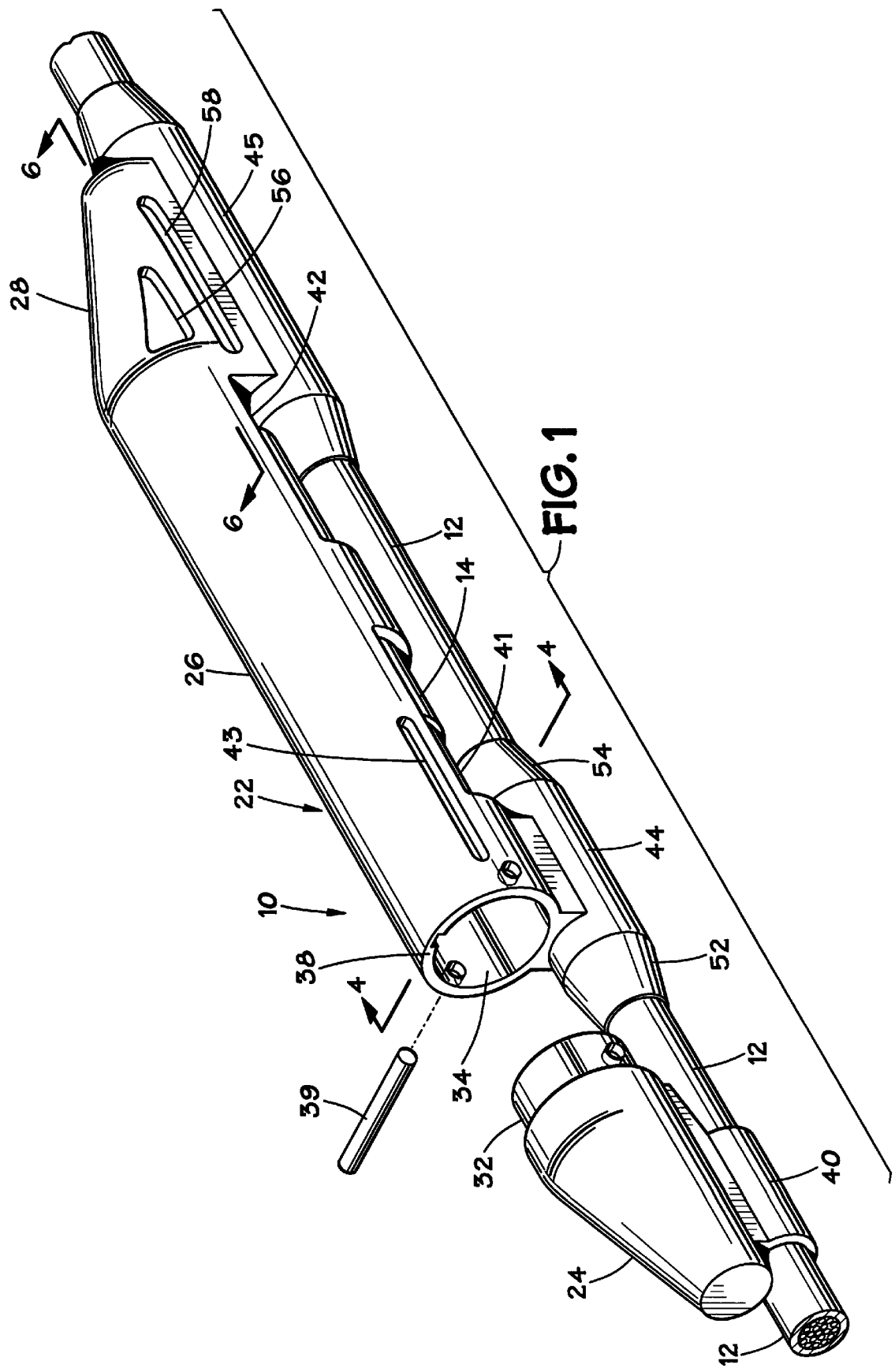
FIG. 1 is a pictorial view of an exemplary seismic sensor pod in accordance with the present invention.
Figure 3:
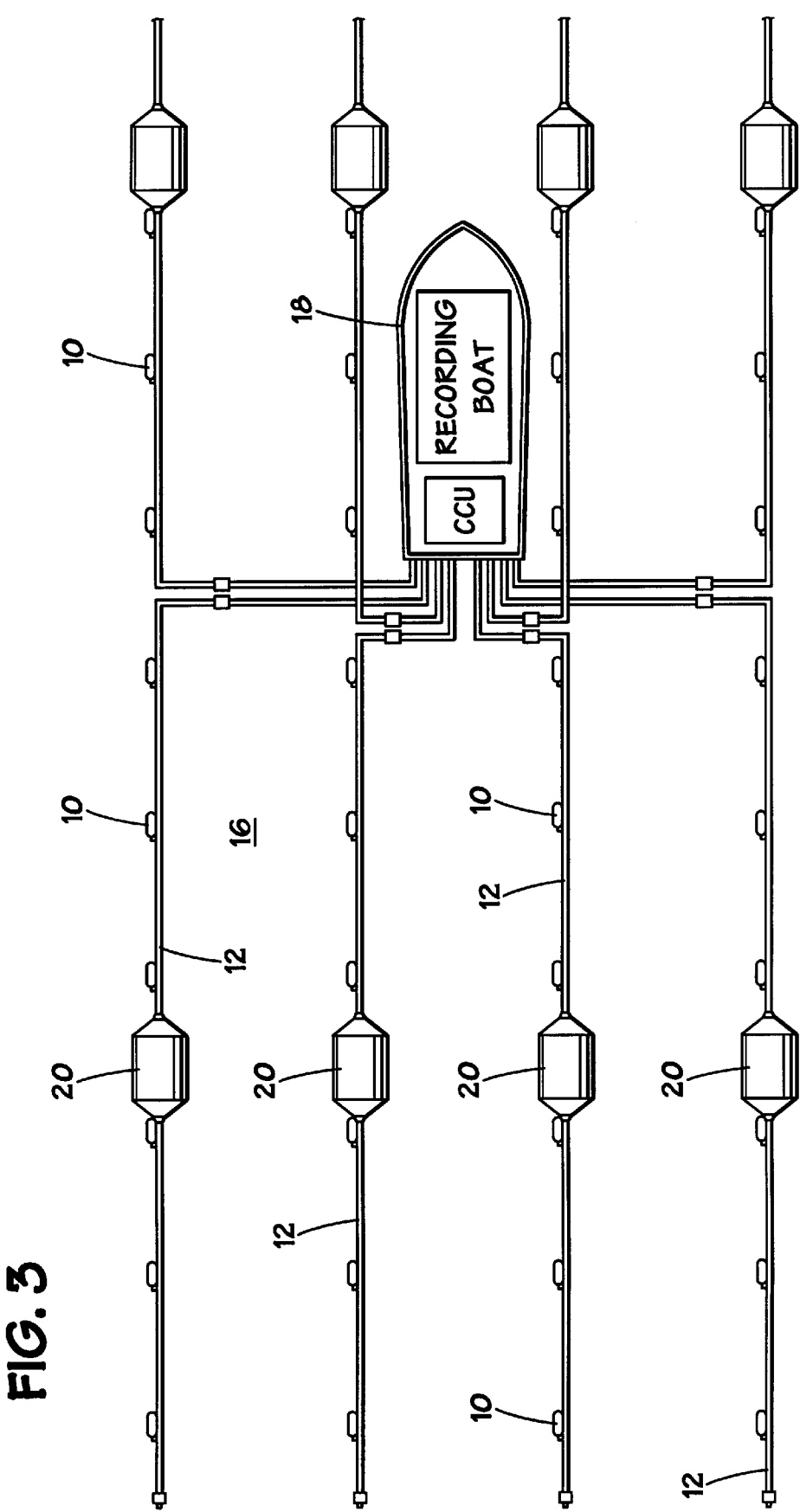
FIG. 3 is a plan view of an array of ocean bottom cables incorporating the seismic sensor pod in accordance with the present invention.

In the drawings described below, reference numerals are generally repeated where identical elements appear in more than one figure. Turning now to the drawings, and in particular to FIGS. 1 and 2, there is shown an exemplary seismic sensor pod 10 coupled to a seismic cable 12 for establishing a substantially water tight connection between the seismic cable 12 and a seismic sensor 14. The seismic cable 12 is of such length that only a portion thereof is shown. The seismic sensor 14 may be either a hydrophone or a geophone, or a combination of each commonly known as a "dual sensor." The seismic cable 12 may be either a transition zone based seismic cable or an ocean bottom cable (OBC). For the purposes of the following discussion, the seismic cable 12 may be considered to be an OBC. Several such seismic cables 12 are assembled into an array as shown in FIG. 3, which is a schematic overhead view of an ocean bottom seismic exploration array. The array includes a plurality of seismic cables 12 laid on the ocean bottom 16 and tethered to a recording boat 18 at the surface. Each cable 12 is typically broken up into segments by one or more modules 20. The modules 20 function as relay stations for the multitude of electronic signals (pass) sent from the seismic pods 10 to the recording boat 18 and vice versa. Each cable 12 may be several thousand meters in length and include several hundred or thousand separate seismic sensor pods 10.

Referring again to FIGS. 1 and 2, the seismic sensor pod 10 includes a housing 22 that has an end cap 24, a central section 26 and a forward section 28. The end cap 24 consists of a generally conical section 30 that has a longitudinally projecting annular member 32 that is dimensioned to fit within a longitudinally disposed bore 34 in the central section 26. The left end of the annular member 32 terminates in an increased diameter annular shoulder 36 which abuts the annular surface 38 on the left end of the central portion when the end cap 24 is engaged with the central section 26. The end cap 24 is provided with a tubular slider 40 through which the seismic cable 12 is journalled. The slider 40 permits the end cap 24 to slide longitudinally along the seismic cable 12 as necessary to insert or remove the seismic sensor 14 from the pod 10 as discussed more fully below. The end cap 24 is moved to the position shown in FIGS. 1 and 2 when the seismic sensor 14 is either inserted into the pod 10 or extracted from the pod 10. After the seismic sensor 14 has been placed in the pod 10, the end cap 24 is moved longitudinally until the annular shoulder 36 engages the annular surface 38. The annular member 32 may be dimensioned to provide a sliding interference fit with the opening 34 and/or a set pin 39 (shown exploded) may be provided so that the end cap 24 may remain in engagement with the central portion 26 when the pod 10 is deployed.

Referring again to FIGS. 1 and 2, the central section 26 is tubular and designed to house the seismic sensor 14. The lower side of the central portion 26 is provided with two longitudinally spaced apart arcuate cut-outs 41 and 42. The cut-outs 41 and 42 expose portions of the seismic sensor 14 to enable operators to determine if a pod 10 is fitted with a seismic sensor 14, and if so, the particular type, and to allow water to readily surround and acoustically couple with the seismic sensor 14. In addition, the cut-outs 41 and 42 reduce the overall weight of the pod 10. Reducing the overall weight of the pod 10 generally reduces the wear and tear on ship-board machinery used to deploy and retrieve the seismic cable 12. To enhance the acoustical coupling of water to the seismic sensor 14, the central portion 26 may also be provided with one or more vents 43 that allow water to readily enter the central section 26 and surround the seismic sensor 14.

The central section 26 and the forward section 28 are secured, respectively, to the seismic cable 12 by couplings 44 and 45. The structure of the coupling 44 is exemplary of both couplings 44 and 45, and may be understood by referring now to FIG. 4, which is a cross sectional view of FIG. 1 taken at section 4—4. The coupling 44 consists of semi-tubular saddle 46 that is integrally molded or otherwise secured at its upper end with the central section 26 and is seated over the seismic cable 12 at its lower end. Note that the seismic cable 12 consists of a tubular jacket 47 enclosing a plurality of conductor wires 48. The saddle 46 has a generally semi-circular cross-section that may be configured in a snap-ring like arrangement to securely engage the cable 12 as shown in FIG. 4. Alternatively, the saddle, now designated 46' may have a more semi-circular character as shown in FIG. 5, which is a view similar to FIG. 4. To firmly secure the saddle 46 to the seismic cable 12 and to seal the interface between the cable 12 and the saddle 46 against water intrusion, a semi-tubular molding 49 is molded around the exterior of the saddle 46 and the lower side of the jacket 47 of the seismic cable 12. As shown in FIGS. 1 and 2, the molding 49 includes conically shaped end pieces 52 and 54.

The housing 22 is advantageously composed of a material that is light weight and corrosion resistant, such as, for example, fiberglass reinforced nylon, glass-filled polyurethane known commonly as Isoplast, or a similar material. The molding 49 is advantageously composed of a light weight, and corrosion resistant, and heat moldable material, such as, for example, polyurethane, thermoplastic rubber ("TPR") or a similar material. The molding 49 is secured to the snap ring member 46 and the cable jacket 50 by well known hot molding processes.

The detailed structure of the forward section 28 of the housing 22 and the connection of the seismic sensor 14 may be understood by referring to FIG. 1 and to FIG. 6, which is a sectional view of FIG. 1 taken at section 6—6. The exterior sides of the forward section 28 include cut-outs 56 and 58 that are provided to reduce the weight of the pod 10. The shape of the cut-outs 56 and 58 is a matter of design discretion. The interior of the forward section 28 includes a substantially sealed chamber 60 that is separated from the open central section 26 by a bulkhead 62. The chamber 60 includes lower opening 64. Another opening 66 is made in the jacket 47 of the seismic cable 12 that is vertically aligned with the opening 64. The overmolding of the molding 49 and the end piece 52 prevent the seepage of water between the forward section 28 and the jacket 47 that would otherwise flood the chamber 60 through the opening 64. Two or more of the conductors 48 are cut and the cut or splice end or ends 68 are passed through the openings 64 and 66 and into the chamber 60. For simplicity of illustration, only one of the conductors 48 is shown. The splice end 68 of the conductor 48 is electrically connected to a second conductor wire 70. The connection between the splice end 68 and the second conductor wire 70 is rendered watertight by an elastomeric splice boot 72, shown in quarter-section. The other end of the second conductor wire 70 is provided with an elastomeric connection boot 74.

Figure 7:
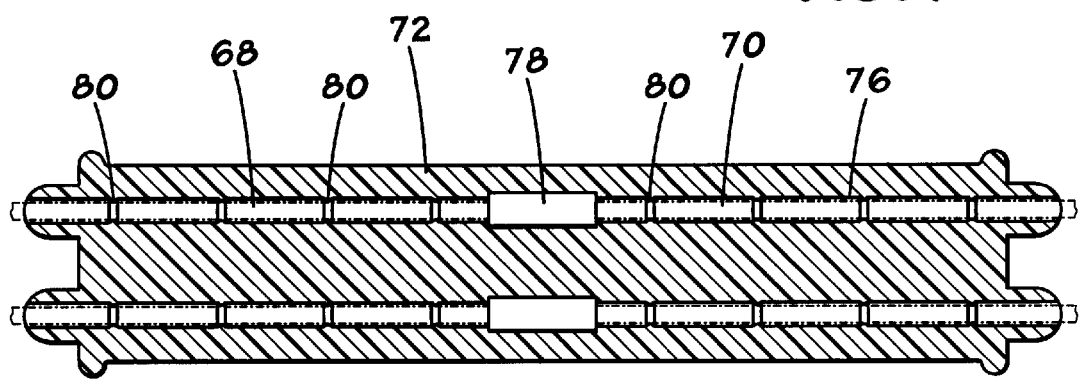
FIG. 7 is a detailed sectional view of a splice boot in accordance with the present invention.
Figure 8:
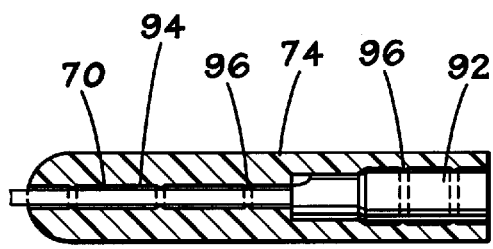
FIG. 8 is a detailed sectional view of an elastomeric boot in accordance with the present invention.

FIG. 7 is a detailed sectional view of the splice boot 72. The splice end 68 is connected to the second conductor wire 70 by a solder joint 76. The splice end 68 and the second conductor wire 70 are disposed in a bore 76 in the splice boot 72 and connected by a solder joint 78. The bore 76 is provided with a plurality of longitudinally spaced inwardly projecting annular shoulders 80 that engage the exterior surfaces of the splice end 68 and the second conductor wire 70 and act as O-ring seals against the infiltration of water. In this way, water penetrating the cable 12 or the splice end 68 will be blocked and prevented from compromising the seismic sensor 14. The splice boot 72 is advantageously composed of an electrically insulating elastomeric material, such as, for example, nitrile rubber, neoprene, Hypaloney, or similar materials.

Electrical connection between the second conductor wire 70 and the seismic sensor 14 is established by a connector member 82. The connector member 82 includes a first connector 84 for electrically connecting to the second conductor wire 70 and a second connector 86 for establishing electrical connection to the seismic sensor 14. The first connector 84 has a first end 88 that is disposed in a bore 90 in the bulk head 62 and The first end 88 is provided with a conductor member 91 that has a first connector or jack 92 that projects into the chamber 60 and an opposite end terminating in a male connector 93. There may be several peripherally spaced conductor members 91, though only one is shown for simplicity of illustration. The second conductor wire 70 is connected to the first jack 92 by soldering, crimping, or other well known techniques. The first jack 92 is depicted as a solder connection. However a variety of different types of electrical connectors may be employed. The conductor member 91 is advantageously composed of a corrosion resistant conducting material, such as, for example, gold plated beryllium-copper alloy, or a similar material. Note that the splice boot 72 may be eliminated if the conductor 48 is long enough to connect directly to the first jack 92.

The elastomeric boot 74 seals the connection between the second conductor wire 70 and the first jack 92 against water intrusion. The detailed structure of the elastomeric boot 74 may be understood by referring now also to FIG. 6, which is a sectional view of the splice boot 74 and the first jack 92. Like the splice boot 72, the elastomeric boot 74 is provided with a longitudinally disposed bore 94 that is provided with a plurality of radially inwardly projecting annular shoulders 96 that function as O-ring seals to establish a seal between the boot 74 and the exterior of the second conductor wire 70 and the exterior of the first jack 92. In this way, water penetrating the cable 12, the splice end 68, and the second conductor wire 70 will be blocked and prevented from compromising the seismic sensor 14. The elastomeric boot 74 may be fabricated from the same materials used to fabricate the splice boot 74.

Referring again to FIG. 6, the first end 84 is a generally tubular structure that is secured to the bulkhead 62 by an annular sleeve 98. The sleeve 98 includes a reduced diameter portion 100 that projects partially through the bulkhead 62 and defines an annular shoulder 102 that abuts against the bulkhead 62. The first end 84 is journalled through the sleeve 98 and secured thereto by a set screw 104. The first end 84 is further prevented from rotational movement relative to the sleeve 98 by a set pin 106 that projects at one end into the sleeve 98 and at the other in a longitudinally disposed slot 108 in the first end 84. The sleeve 98 is advantageously composed of a corrosion resistant metallic material, such as 316 stainless steel, or similar materials. O-rings 110 and 112 provide, respectively, seals between the exterior of the first end 84 and the bulk head 62 and the interior surface of the sleeve 98. In this regard, the seepage of water between the bulk head 62 and the first end 84 is retarded. The first end 84 is advantageously composed of a material that may be molded around the conductors 114, such as, for example, FibeRite® glass reinforced epoxy from Cosmic Plastic in California, silica glass from ICI Chemicals, Ltd., or similar materials.

The second end 86 is provided with an elastomeric boot 118 for establishing water resistant physical engagement between the second end 86 and the first end 84. The boot 118 includes a bore 120 that is sized to accommodate the right end of the first end 84. To inhibit the seepage of water past the connection between the first end 84 and the boot 118, the right end of the first end 84 is provided with a radially outwardly projecting annular shoulder 122 that engages a corresponding annular groove 124 in the boot 118 to provide an O-ring like seal. Interaction between the annular shoulder 122 and the groove 124 not only provides a seal against the infiltration of water, but also provides a secure physical attachment to hold the seismic sensor 14 in position. The second end 86 is provided with a mounting adaptor 126 for establishing physical connection between the second end 86 and the seismic sensor 14. The exterior of the boot 118 is provided with a radially projecting annular shoulder 127 that is disposed in a corresponding annular slot 128 in the adaptor 126. The interaction between the shoulder and the slot secures the boot 118 to the adaptor 126.

The function of the adaptor 126 will be described in conjunction with a description of the seismic sensor 14. The seismic sensor 14 includes a metallic tubular can 128 that encloses a sensing instrument 130 and tubular inserts 132 and 134. The can 128 is connected to the tubular insert 134 by way of one more set screws 136. O-rings 138 and 140 are provided to respectively seal the interfaces between the can 130 and the tubular insert 134, and the tubular insert 134 and the tubular insert 132. The sensing instrument 130 normally includes one or more conductor wires 142. A longitudinal passage 144 is provided in the right ends of the tubular inserts 134 and 132 to provide a physical pathway for the conductor wire 142 or the wire 42 may be passed through a radially projecting passage 145. The adaptor 126 is provided with a reduced diameter portion 146 that projects longitudinally into a bore 148 in the tubular insert 134. The reduced diameter portion 146 defines an annular shoulder 150 that abuts against the left end of the tubular insert 134. The adaptor 126 is secured to the tubular insert 134 by a set screw 152. The interface between the exterior of the reduced diameter portion 146 and the interior of the tubular insert 134 is sealed against the seepage of water by O-rings 154 and 156.

Figure 9:
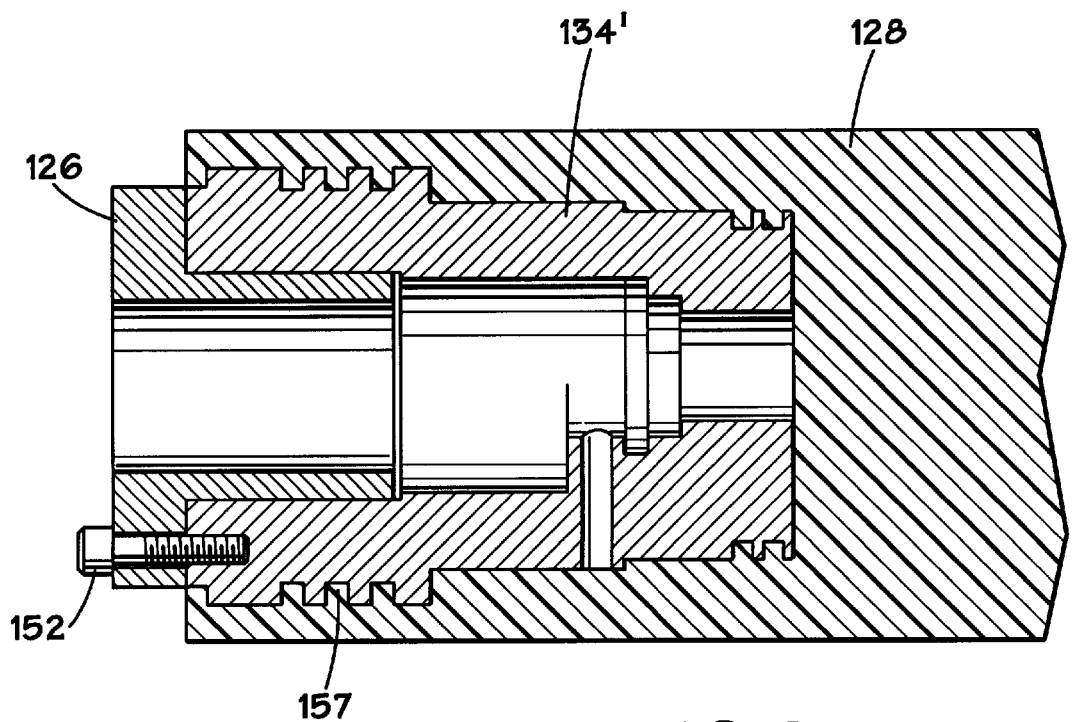
FIG. 9 is a sectional view of an alternate embodiment of the connection between the seismic sensor and the connector member in accordance with the present invention.

FIG. 9 is a sectional view of an alternative arrangement for securing the can 128 to the adaptor 126. For simplicity of illustration, only the adaptor 126, the can 128, and the tubular insert, now designated 134'. The adaptor 126 is secured to the tubular insert 134' by bolts 152 as before.

However, the insert 134' is provided with a plurality of external annular grooves 157. The can 128 is fabricated from a moldable plastic material and is molded over the insert 134'. The grooves 157 serve as troughs for the moldable plastic to fill and thereby form a sealing engagement. The plastic material may be the same material that is used to fabricate the molding 49 shown in FIG. 6.

A cylindrical block 160 is disposed between the boot 118 and the end cap 158. The block 160 is advantageously composed of the same type of epoxy material used to fabricate the first end 84. The block 160 encases a portion of a longitudinally disposed female connector 162 that is adapted to engage the male connector 116 at one end and the conductor wire 142 at the other. There may be several such female connectors 162 peripherally spaced. The male connector 116 and the female connector may be fabricated from the same materials used to make the first jack 92. It is advantageous that the exterior of the female connector 162 be knurled to provide a surface that will aggressively adhere to the epoxy of the block 160. The connection with the conductor wire 142 may be by soldering, crimping, or other known techniques. The upper portion of the adaptor 126 is provided with a radially projecting alignment pin 164. The pin 164 is dimensioned to engage a longitudinal slot 166 formed on the interior surface of the central section 26. The slot 166 and the alignment pin 164 establish a mechanism for enabling the second end 86 to be coupled to the first end 84 in a known angular orientation so that the male connector 116 engages the corresponding female connector 162.

Commercially available models of the seismic sensor 14 may be readily fitted to the connector member 82 by inserting the adaptor 126 into the tubular insert 134 and setting the set screw 152. Prior to inserting the adaptor 126, the conductor wire or wires 142 from the seismic sensor 130 should be connected to the corresponding female connector or connectors 162. The seismic sensor 14 may then be advanced into the housing 22 until the second end 86 engages the first end 84. As discussed above, this physical engagement not only includes a physical engagement between the boot 118 and the first end 84, but also the physical connections between the corresponding male member or members 116 and the female member or members 162. If the seismic sensor 14 must be maintained or replaced, thrust is applied to the phone 14 until the boot 118 slips off of the first end 84. This type of maintenance may be readily undertaken onboard ship. Similarly, if the entire connector member 82 must be repaired or replaced at sea, the pod 10 may be brought onboard ship and the connector member 82 removed by loosening the set screw 104 and removing the connector member 82.

The skilled artisan will appreciate that the pod 10 provides a water resistant pathway between the conductors 48 of the seismic cable 12 and the seismic sensor 130. The water resistant pathway is made possible by the employment of the splice boot 72, the elastomeric boot 74, the sealed connection between the connector member 82 and the bulk head 62, the sealed engagement between the first end 84 and the boot 118, and the sealed engagement between the adaptor 126 and the tubular insert 134. Even if water penetrates the seismic cable 12, further infiltration of water to the seismic sensor 14 will be retarded by the foregoing sealing arrangements. In addition, the pod 10 provides a streamlined and more highly integrated physical connection between a seismic sensor and a seismic cable that eliminates pigtails and leakage potential associated with conventional seismic phone connectors.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A pod for coupling a seismic sensor to a seismic cable having a first conductor, comprising:

a coupling for establishing sealing engagement with the exterior of the seismic cable;

a housing coupled to the coupling for holding the seismic sensor and having a substantially sealed chamber; and a connector member coupled to the housing and having a first connector having a first end disposed in the substantially sealed chamber for providing substantially sealed electrical connection to the first conductor, and a second connector for providing substantially sealed electrical connection to the seismic sensor.

2. The pod of claim 1, wherein the first connector comprises a second conductor and a first elastomeric boot to seal the connection between the first conductor and the second conductor.

3. The pod of claim 1, wherein the second connector comprises an adaptor to engage the seismic sensor, a socket connection to provide an electrical pathway between the connector member and the seismic sensor, and a second elastomeric boot coupled to the adaptor to seal the socket connection.

4. The pod of claim 1, wherein the first connector comprises a second conductor and a first elastomeric boot to seal the connection between the first conductor and the second conductor, and the second connector comprises an adaptor to engage the seismic sensor, a third conductor to provide an electrical pathway between the connector member and the seismic sensor, and a second elastomeric boot coupled to the adaptor to seal the connection between the third conductor and the second conductor.

5. The pod of claim 1, comprising a third conductor electrically connected to the first conductor and to the first connector, a second elastomeric boot covering the connection between the third conductor and the first conductor, and a third elastomeric boot covering the connection between the third conductor and the first conductor.

6. A seismic cable system, comprising:

a seismic cable having a first plurality of conductor wires;

a pod sealingly coupled to the seismic cable, the pod having a housing that has a substantially sealed chamber;

a connector member coupled to the housing and having a first connector having a first end disposed in the substantially sealed chamber and being sealingly coupled to the first plurality of conductor wires, the connector member having a second connector; and a seismic sensor coupled to the second connector and being disposed within the housing.

7. The seismic cable system of claim 6, wherein the first connector comprises a first plurality of conductors to electrically connect with the first plurality of conductor wires, and a first plurality of elastomeric boots to seal the respective connections between the first plurality of conductor wires and the first plurality of conductors.

8. The seismic cable system of claim 7, wherein the second connector comprises an adaptor to engage the seismic sensor, a second plurality of conductors to provide electrical pathways between the connector member and the seismic sensor, and an elastomeric boot coupled to the adaptor member to seal the connections between the first and second pluralities of conductors.

9. The seismic cable system of claim 6, wherein the first connector comprises a plurality of sockets to electrically connect with the first plurality of conductor wires, and a first plurality of elastomeric boots to seal the respective connections between the first plurality of conductor wires and the plurality of sockets, and the second connector comprises an adaptor to engage the seismic sensor, a plurality of socket connections to provide electrical pathways between the connector member and the seismic sensor, and an elastomeric boot coupled to the adaptor to seal the plurality of socket connections.

10. The seismic cable system of claim 6, comprising a second plurality of conductor wires, each of said second plurality of conductor wires being electrically connected to one of said first plurality of conductor wires and to the first connector, an elastomeric boot covering the connection between the second plurality of conductor wires and the first plurality of conductor wires, and a second plurality of elastomeric boots, each of the second plurality of elastomeric boots respectively covering the connection between one of the second plurality of conductor wires and one of the first plurality of conductor wires.

11. A pod for coupling a seismic sensor to a seismic cable, comprising:

a coupling for establishing sealing engagement with the exterior of the seismic cable;

a tubular housing coupled to the coupling and having a substantially sealed chamber;

a connector member coupled to the housing and having a first connector having a first end disposed in the substantially sealed chamber, and a second connector having a second end, the first connector and the second connector being connected;

a first conductor sealingly coupled to the first connector and to the seismic cable;

an adaptor having a first end sealingly coupled to the second connector, the adaptor and the second connector defining an electrical socket connection; and a seismic sensor coupled to the adaptor.

12. The pod of claim 11, wherein the first connector comprises a jack to electrically connect with the first conductor and a first elastomeric boot to seal the connection between the first conductor and the jack.

13. The pod of claim 11, wherein the adaptor has a second elastomeric boot coupled to seal the electrical socket connection.

14. The pod of claim 11, wherein the first connector comprises a jack to electrically connect with the first conductor and a first elastomeric boot to seal the connection between the first conductor and the socket, and the adaptor member has a second elastomeric boot coupled to the adaptor to seal the electrical socket connection.

15. The pod of claim 11, comprising a second conductor electrically connected to the first conductor and to the first connector, a third elastomeric boot covering the connection between the second conductor and the first conductor, and a fourth elastomeric boot covering the connection between the second conductor and the first connector.

16. A method of making a water resistant electrical circuit between a seismic sensor and a seismic cable wherein the seismic cable has a first conductor, comprising the steps of:

providing a second conductor;

forming a first connection between the second conductor and the first conductor;

sealing the first connection with a first elastomeric boot;

providing a connector member;

forming a second connection between the connector member and the second conductor;

sealing the second connection with a second elastomeric boot;

forming a third connection between the connector member and the seismic sensor; and sealing the third connection with a third elastomeric boot.

17. The pod of claim 1, wherein the coupling comprises a semi-tubular saddle and a semi-tubular molding molded around the exterior of the semi-tubular saddle.

18. The pod of claim 6, comprising a coupling for sealingly coupling the pod to the exterior of the seismic cable having a semi-tubular saddle and a semi-tubular molding molded around the exterior of the semi-tubular saddle.

19. The pod of claim 11, wherein the coupling comprises a semi-tubular saddle and a semi-tubular molding molded around the exterior of the semi-tubular saddle.

* * * * *